United States Patent
Min et al.

(10) Patent No.: US 9,228,340 B2
(45) Date of Patent: Jan. 5, 2016

(54) VACUUM THERMAL INSULATION MATERIAL EQUIPPED WITH A GETTER MATERIAL FOR WATER-FRACTION AND GAS ADSORPTION, AND PRODUCTION METHOD THEREFOR

(75) Inventors: Byung Hoon Min, Ulsan (KR); Sung Seock Hwang, Cheongju-si (KR); Seung Min Jeon, Busan (KR); Jung Pil Han, Ulsan (KR)

(73) Assignee: LG HAUSYS, LTD., Seoul (KR)

( * ) Notice: Subject to any disclaimer, the term of this patent is extended or adjusted under 35 U.S.C. 154(b) by 76 days.

(21) Appl. No.: 14/235,665

(22) PCT Filed: Aug. 7, 2012

(86) PCT No.: PCT/KR2012/006265
§ 371 (c)(1),
(2), (4) Date: Jan. 28, 2014

(87) PCT Pub. No.: WO2013/027946
PCT Pub. Date: Feb. 28, 2013

(65) Prior Publication Data
US 2014/0178626 A1    Jun. 26, 2014

(30) Foreign Application Priority Data
Aug. 23, 2011    (KR) .......................... 10-2011-0083822

(51) Int. Cl.
*F16L 59/065*    (2006.01)
*E04B 1/70*    (2006.01)
(Continued)

(52) U.S. Cl.
CPC ... *E04B 1/70* (2013.01); *B32B 3/04* (2013.01); *B32B 3/08* (2013.01); *B32B 5/26* (2013.01);
(Continued)

(58) Field of Classification Search
CPC ............................... E04B 1/803; F16L 59/065
USPC ............................................................ 428/69
See application file for complete search history.

(56) References Cited

U.S. PATENT DOCUMENTS 5,532,034 A * 7/1996 Kirby et al. ................... 428/69
7,833,327 B2 * 11/2010 Hirai et al. .................... 96/153

FOREIGN PATENT DOCUMENTS

CN    1225381 A    8/1999
CN    1659402 A    8/2005
(Continued)

OTHER PUBLICATIONS

Chinese Office Action dated Nov. 3, 2014.
(Continued)

*Primary Examiner* — Alexander Thomas
(74) *Attorney, Agent, or Firm* — Hauptman Ham, LLP (57) ABSTRACT

The vacuum thermal insulation material of the present invention comprises: a core material part which is hermetically sealed under reduced pressure; a getter part which is provided on one side in the middle of the core part; and an outer skin material part which surrounds the core material part and is hermetically sealed. In the getter part, a getter material, comprising a mixture of a hygroscopic material and a gas-adsorbing material, is packed in the form of a nonwoven fabric. In the vacuum thermal insulation material of the present invention, the hygroscopic material is any one of calcium oxide, calcium chloride, zeolite, silica gel, alumina and activated carbon, while the gas-adsorbing material is an oxygen-adsorbing material comprising a Fe based compound; and the hygroscopic material and the gas-adsorbing material are mixed in a ratio of between 20:1 and 200:1.

6 Claims, 6 Drawing Sheets

(51) Int. Cl.
  *B32B 3/04* (2006.01)
  *B32B 3/08* (2006.01)
  *B32B 5/26* (2006.01)
  *E04B 1/80* (2006.01)

(52) U.S. Cl.
  CPC .............. *E04B 1/803* (2013.01); *F16L 59/065* (2013.01); *B32B 2262/023* (2013.01); *B32B 2262/0253* (2013.01); *B32B 2262/0276* (2013.01); *B32B 2262/101* (2013.01); *B32B 2307/304* (2013.01); *B32B 2307/31* (2013.01); *B32B 2307/7242* (2013.01); *Y10T 156/1064* (2015.01); *Y10T 428/231* (2015.01)

(56) References Cited

FOREIGN PATENT DOCUMENTS

| | | | |
|---|---|---|---|
| CN | 101666416 | A | 3/2010 |
| JP | 11-144734 | * | 5/1999 |
| JP | 2000280266 | A | 10/2000 |
| JP | 3465713 | B1 | 11/2003 |
| JP | 2006046512 | A | 2/2006 |
| JP | 2006153150 | A | 6/2006 |
| JP | 2006316872 | A | 11/2006 |
| JP | 2008045580 | A | 2/2008 |
| JP | 2008064135 | A | 3/2008 |
| KR | 20110077859 | A | 7/2011 |
| KR | 20110077860 | A | 7/2011 |
| KR | 20110080426 | A | 7/2011 |

OTHER PUBLICATIONS

Japanese Office Action dated Feb. 27, 2015.
International Search Report for PCT/KR2012/006265 mailed on Jan. 21, 2013.

* cited by examiner

Fig. 1

--Prior Art--

VACUUM THERMAL INSULATION MATERIAL EQUIPPED WITH A GETTER MATERIAL FOR WATER-FRACTION AND GAS ADSORPTION, AND PRODUCTION METHOD THEREFOR

CROSS REFERENCE TO RELATED APPLICATION

This application claims the priority of Korean Patent Application No. 10-2011-0083822 filed on Aug. 23, 2011 in the Korean Patent and Trademark Office. Further, this application is the National Phase application of International Application No. PCT/KR2012/006265 filed on Aug. 7, 2012, which is incorporated herein by reference in its entirety.

TECHNICAL FIELD

The present invention relates to a vacuum insulation material having a getter material for absorption of water and gas and a method of manufacturing the same, and more particularly, to a vacuum insulation material that includes a getter material for absorbing moisture and gas to improve durability while reducing manufacturing costs, and a method of manufacturing the same.

BACKGROUND ART

As disclosed in Korean Patent Laid-open Publication No. 2011-0077860 (Jul. 7, 2011), a vacuum insulation material generally includes a core material for maintaining a shape of the insulation material while supporting a difference between an internal pressure and atmospheric pressure, an outer skin for interrupting gas to maintain the insulation material in a vacuum while sealing the core material, and a getter material for absorbing residual gas in the insulation material and other gases to maintain a vacuum for a long time.

Figure 1:
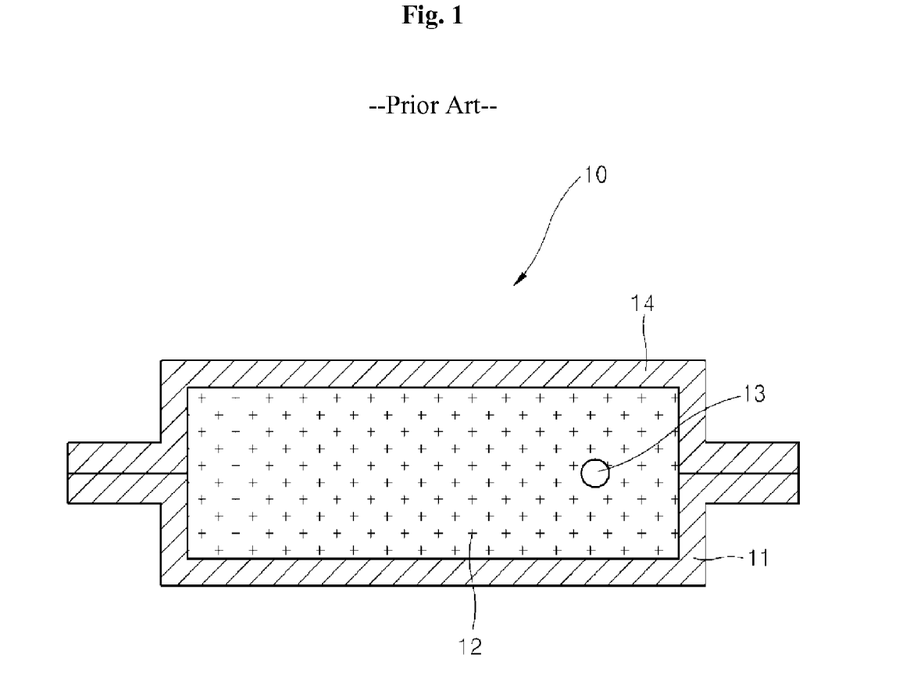
FIG. 1 is a sectional view of a conventional vacuum insulation material.

Referring to FIG. 1, a vacuum insulation material 10 includes a core portion 11 including a core material 12 and an outer skin 14 enclosing the core portion 11, and a stick-type getter material 13 may be directly inserted into the core material 12.

The getter material 13 plays an important role in securing durability of the vacuum insulation material 10 for a long time, and such a conventional getter material 13 may absorb gas except for inert gas such as $CO/CO_2$ and hydrocarbon gas in addition to $N_2$, $O_2$, and $H_2$ that are main substances of air.

However, since the conventional getter material requires high raw material costs and heat treatment at a temperature of 300° C. or higher for activation before use thereof, and additionally include an adsorbent for absorption of moisture, thereby increasing manufacturing costs.

DISCLOSURE

Technical Problem

An aspect of the present invention is to provide a vacuum insulation material that includes a getter material for absorption of water and gas to improve durability while reducing manufacturing costs.

Another aspect of the present invention is to provide a method of manufacturing a vacuum insulation material.

Technical Solution

In accordance with an aspect of the present invention, a vacuum insulation material includes: a core portion sealed in a pressure reduced state; a getter unit disposed at one side of an intermediate portion of the core portion; and an outer skin enclosing the core portion while sealing the core portion. The getter unit is formed by packing a getter material, in which a moisture absorbent and a gas adsorbent are mixed, with non-woven fabrics.

The moisture absorbent may include one material selected from calcium oxide, calcium chloride, zeolite, silica gel, alumina and activated carbon, and the gas adsorbent may include an oxygen adsorbent composed of an Fe-based compound.

The moisture absorbent and the gas adsorbent may be mixed in a ratio of 20:1 to 200:1.

In accordance with another aspect of the present invention, a method of manufacturing a vacuum insulation material includes preparing components including upper and lower cores each having a getter fitting section between an upper outer skin and a lower outer skin, and a getter unit engaging with the getter fitting section; and placing the components in a chamber under vacuum, followed by thermal compression, wherein the getter unit is prepared by packing a getter material, in which a moisture absorbent and a gas adsorbent are mixed, with non-woven fabrics.

The thermal compression may be performed in a direction towards the getter unit from above an upper thermal compression jig engaging with an upper side of the upper outer skin and from below a lower thermal compression jig engaging with a lower side of the lower outer skin.

Advantageous Effects

According to the present invention, gas generated in the vacuum insulation material can be easily absorbed by a getter material in which a moisture absorbent is mixed with a small amount of a gas adsorbent to improve durability by maintaining the vacuum insulation material in a pressure reduced state.

The method according to the present invention can provide a vacuum insulation material that can reduce manufacturing costs, maintain a pressure reduced state thereof, and improve durability using a getter material in which a small amount of gas adsorbent is mixed with a moisture absorbent.

BEST MODE

Hereinafter, embodiments of the present invention will be described in detail with reference to the accompanying drawings. It should be understood that the present invention is not limited to the following embodiments and may be embodied in different ways.

Figure 2:
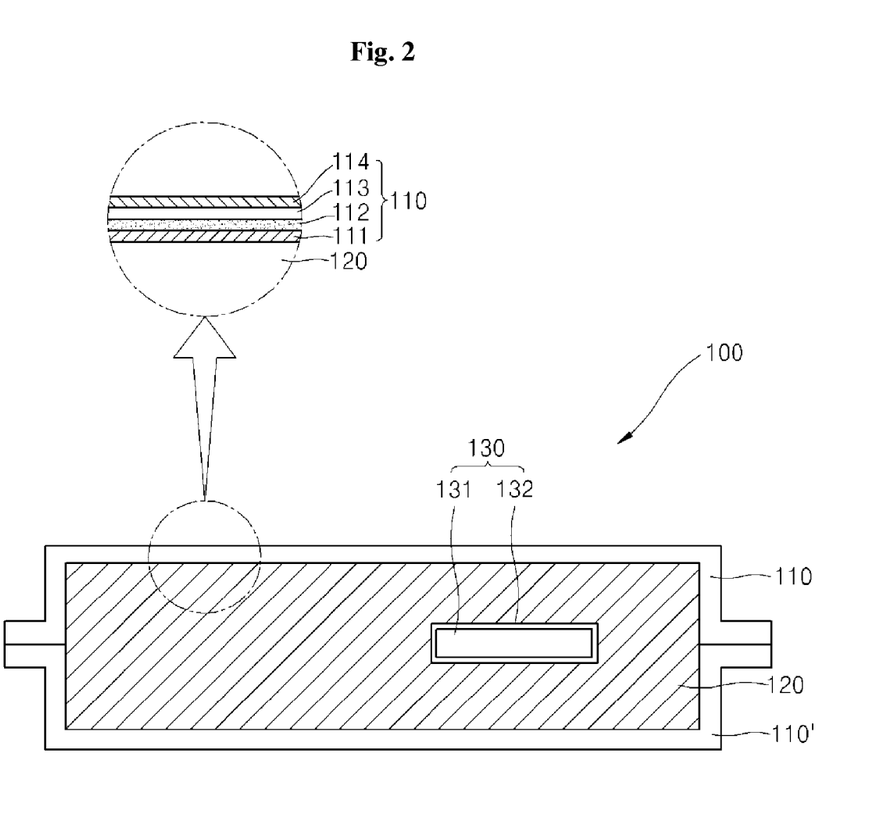
FIG. 2 is a sectional view of a vacuum insulation material according to one embodiment of the present invention.

As shown in FIG. 2, a vacuum insulation material 100 according to one embodiment of the present invention includes a core portion 120 sealed in a pressure reduced state, a getter unit 130 mounted on a getter fitting section 123 formed at an intermediate portion of the core portion 120, and outer skins 110, 110' enclosing the core portion 120 while sealing the core portion 120.

The outer skins 110, 110' include an upper outer skin 110 and a lower outer skin 110' that enclose the core portion 120 at upper and lower portions of the core portion 120' while sealing the core portion 120. Each of the upper and lower outer skins 110, 110' includes a thermally compressed layer 111 enclosing the core portion 120 while contacting the core portion 120, a gas barrier layer 112, a first protective layer 113, and a second protective layer 114.

The thermally compressed layer 111 is formed in each of the upper and lower outer skins 110, 110' and encloses the core portion 120 to be thermally compressed together with the core portion 120 along a periphery of the core portion 120 in a process of manufacturing the vacuum insulation material 100. The thermally compressed layer 111 may be formed of a polyethylene resin, such as linear low density polyethylene (LLDPE), low density polyethylene (LDPE), very low density polyethylene (VLDPE), and high density polyethylene (HDPE), a thermally compressible resin such as polypropylene, and mixtures thereof.

The gas barrier layer 112 covers an outer surface of the thermally compressed layer 111 and may be formed of a metal foil such as an aluminum foil, or a plastic film on which a metal, a metal oxide, a carbon material such as diamond is deposited to prevent gas penetration therethrough.

The first protective layer 113 and the second protective layer 114 sequentially cover an outer surface of the gas barrier layer 112 to secure mechanical strength. The first protective layer 113 and the second protective layer 114 may be formed of at least one resin selected from the group consisting of polyamide, polypropylene, polyethylene terephthalate, polyacrylonitrile, polyvinyl alcohol, Nylon, PET, K-PET, and ethylene vinyl alcohol resins.

The core portion 120 is a member, which is enclosed by the upper and lower outer skins 110, 110' and is sealed in a pressure reduced state, and may be formed of at least one material selected from the group consisting of inorganic fibers such as glass wool, organic fibers such as polyester fibers, expanded resins such as polyurethane, polystyrene, polyethylene, and polypropylene, inorganic powder such as fumed silica, perlite, and carbon black, and organic powder such as synthetic resin powder, or synthetic materials thereof. Here, when the core portion 120 is formed of the synthetic materials, the core portion 120 may have a structure in which a plurality of synthetic material layers is stacked.

The getter unit 130 is a member including a getter material 131 for adsorption of water and gas, which is mounted on the getter fitting section 123 formed at the intermediate portion of the core portion 120, and non-woven fabrics 132. Here, the getter material 131 includes a moisture absorbent and a gas adsorbent mixed in a ratio of 20:1 to 200:1 and is packed with the non-woven fabric.

Here, the moisture absorbent may be a nano-porous material, which is formed of at least one material selected from among calcium oxide, calcium chloride, zeolite, silica gel, alumina, activated carbon, and mixtures or composites thereof, and the selective gas adsorbent may be at least one synthetic nano-porous material formed of at least one selected from among zeolite, activated carbon, alumina, and combinations thereof; metal such as Ta, Cb, Zr, Th, Mg, Ba, Ti, Al, Nb, Fe, Li, Pd, Pt, and Au; or metal oxides thereof.

The getter material 131 may selectively employ a gas adsorbent according to gas emitted from the core portion 120 and gas emitted from the outer skins 110, 110'. For example, when carbon dioxide or atmospheric gas, such as oxygen, hydrogen, and nitrogen, is emitted from the core portion 120, or hydrocarbon or moisture is emitted from the outer skins 110, 110', the metal or metal oxide may be used as a gas adsorbent according to the gases.

In particular, when the getter material 131 includes an oxygen adsorbent as a selective gas adsorbent, the oxygen adsorbent may employ an Fe-based compound, such as $Fe_3O_4$, $Zn_2[Fe(CN)_6]$, $Zn_3[Fe(CN)_6]_2$, $Ce[Fe(CN)_6]$, and the like.

Polypropylene (PP) non-woven fabrics or polyethylene (PE) non-woven fabrics may be used as the non-woven fabrics 132 to prevent separation of the getter material 131 that may be used in powder form.

The vacuum insulation material 100 can easily adsorb gas emitted from the core portion 120 and the outer skins 110, 110' using the getter material 131, in which the moisture absorbent is mixed with a small amount of the gas adsorbent, to maintain a pressure reduced state of the vacuum insulation material 100, thereby improving durability.

Figure 3A:
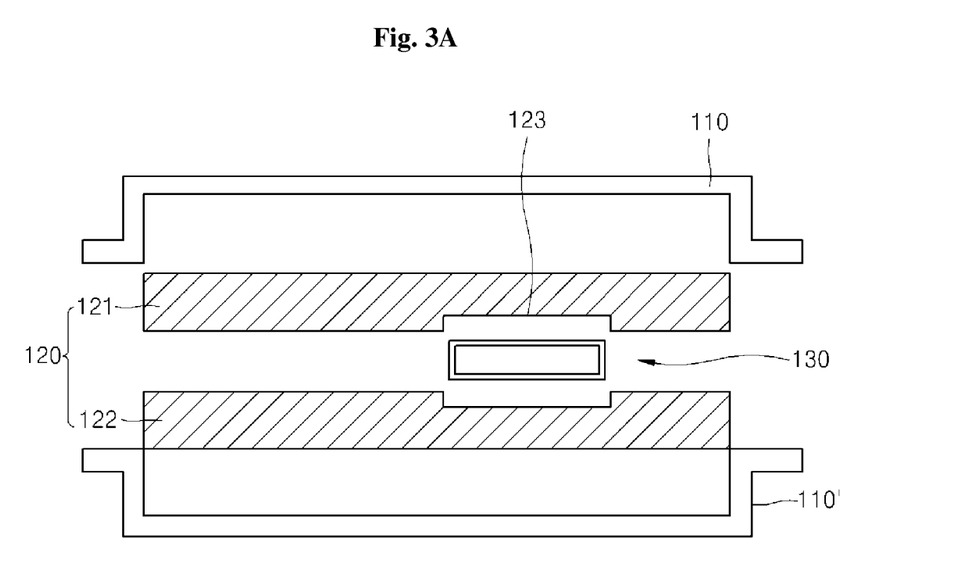
FIGS. 3a to 3c are sectional views illustrating a method of manufacturing a vacuum insulation material according to one embodiment of the present invention.
Figure 3B:
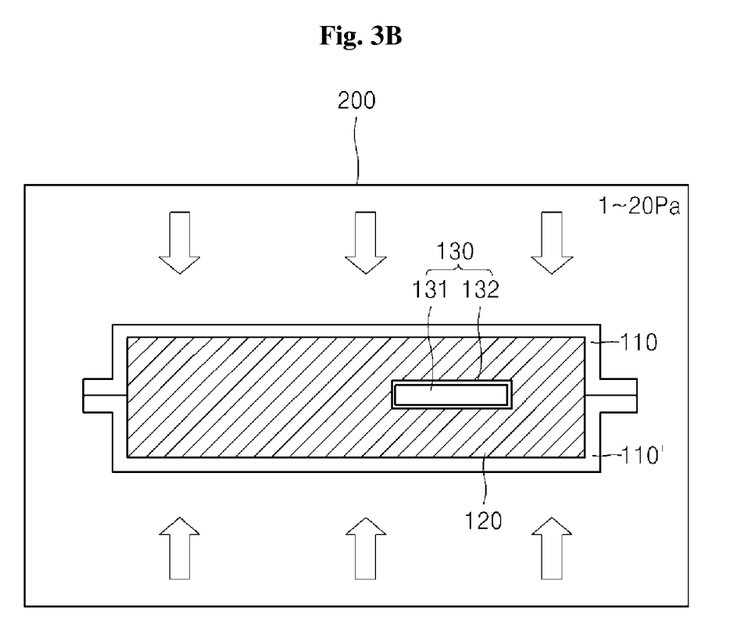
Figure 3C:
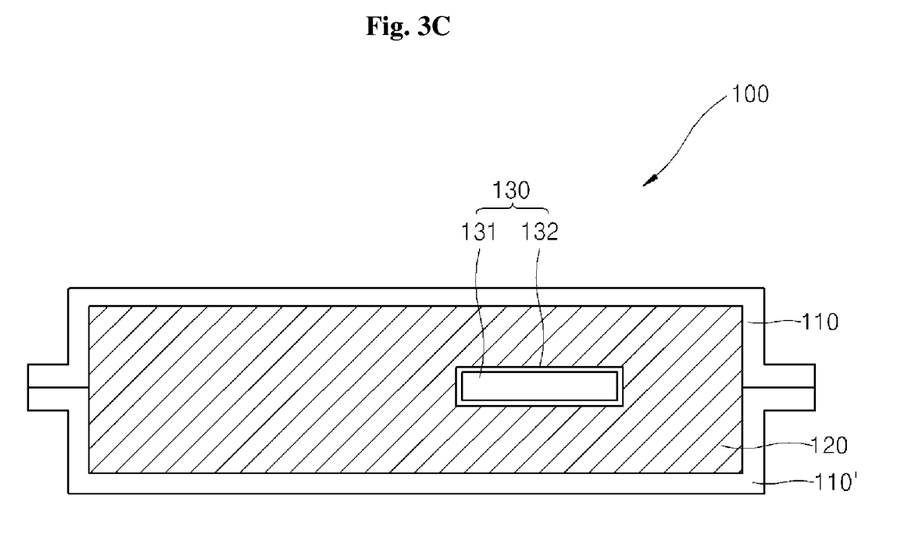

Hereinafter, a method of manufacturing a vacuum insulation material 100 according to one embodiment of the invention will be described with reference to FIGS. 3a to 3c. FIGS. 3a to 3c are sectional views illustrating a method of manufacturing a vacuum insulation material according to the embodiment.

Referring to FIG. 3a, in the method of manufacturing the vacuum insulation material 100 according to the embodiment of the present invention, an upper core 121 and a lower core 122 each including a getter fitting section 123 engaging with a getter unit 130 between an upper outer skin 110 and a lower outer skin 110' are prepared first.

Here, the getter fitting sections 123 formed in the upper and lower cores 121, 122 are previously formed in a recess shape by cutting and pressing corresponding sections of the upper and lower cores 121, 122 at the same time. Each of the getter fitting sections 123 may correspond to the size of the getter unit 130, or may be larger than the getter unit 130.

The getter unit 130 in which a moisture absorbent and a gas adsorbent are mixed in a ratio of 20:1 to 200:1 may be heated and activated at 450° C., and then may be packed with non-woven fabrics 132. Here, since a small amount of gas adsorbent can sufficiently adsorb gas, the gas adsorbent is mixed in an amount of 0.50 g to 1 g in the above ratio, preferably in an amount of 5 g.

After the components of the vacuum insulation material 100 are prepared, the components of the vacuum insulation material 100 are placed in a chamber 200 under a vacuum and are thermally compressed, as shown in FIG. 3b.

Specifically, the vacuum of the chamber 200 is maintained at a pressure of 1 Pa to 20 Pa, as required for the interior of the vacuum insulation material 100, and the components of the vacuum insulation material 100 are prepared in this state. Here, in order to prevent modification of the gas adsorbent, the interior of the pressure reduced chamber 200 may be selectively set to an inert gas atmosphere, such as He, Ar, and the like.

For the components of the prepared vacuum insulation material 100, the upper outer skin 110 and the lower outer skin 110' are coupled and thermally compressed to each other by thermal compression jigs. Specifically, the upper outer skin 110 and the lower outer skin 110' are thermally compressed to each other from above an upper thermal compression jig engaging with an upper side of the upper outer skin 110 and from below a lower thermal compression jig engaging with a lower side of the lower outer skin 110', and thermally compressed layer 111 constituting the upper outer skin 110 and the lower outer skin 110' are integrally bonded to each other along peripheries thereof.

Accordingly, the upper and lower cores 121, 122 between the upper and lower outer skins 110, 110' are integrally fused to each other, and the getter unit 130 is engaged with the getter fitting sections 123 of the upper and lower cores 121, 122 to be mounted thereon.

When thermal compression is performed using the thermal compression jigs in this way, the vacuum insulation material 100 is completely manufactured, as shown in FIG. 3c.

Here, the vacuum state of the chamber 200 is released and the internal pressure of the chamber 200 increases from 1~20 Pa to an atmospheric pressure of about $1 \times 10^5$ Pa. Alternatively, the interior of the vacuum insulation material 100 sealed by the outer skins 110, 110' may be maintained in a vacuum of 1 Pa to 20 Pa.

In the method according to the embodiment of the invention, the vacuum insulation material 100 capable of easily adsorbing gas emitted from the core portion 120 and the outer skins 110, 110' is manufactured using the getter material 131 in which a small amount of the gas adsorbent is mixed with the moisture absorbent, while maintaining a pressure reduced state of the vacuum insulation material 100, thereby reducing manufacturing costs while improving durability of the vacuum insulation material.

Next, the present invention will be described in more detail with reference to an example and comparative examples. Here, it should be understood that the following examples are provided for illustration only and are not to be construed in any way as limiting the present invention. A description of details apparent to those skilled in the art will be omitted.

EXAMPLE

A vacuum insulation material 100 according to the present invention was prepared. A getter material 131 was prepared by mixing a moisture absorbent composed of calcium oxide (CaO) and an oxygen adsorbent composed of an Fe-based compound selected from among $Fe_3O_4$, $Zn_2[Fe(CN)_6]$, $Zn_3[Fe(CN)_6]_2$, and $Ce[Fe(CN)_6]$ in a ratio of 40:1, and was packed with polypropylene (PP) non-woven fabrics 132 to prepare a getter unit 130, which in turn was disposed in a core portion 120 in which glass wool was stacked.

Each of outer skins 110, 110' includes a thermally compressed layer 111 having a thickness of about 50 μm and formed of linear low density polyethylene (LLDPE), a gas barrier Al layer 112 having a thickness of about 6 μm, a first protective layer 113 having a thickness of about 25 μm and formed of Nylon, and a second protective layer 114 formed of a polyvinylidene chloride (PVDC) coated polyethylene terephthalate (K-PET) resin and having a thickness of about 12 μm.

After measuring initial thermal conductivity of the vacuum insulation material 100, the vacuum insulation material 100 was subjected to heat treatment at 90° C. for 6 weeks, followed by measurement of thermal conductivity of the vacuum insulation material 100 using a thermal conductivity tester.

Comparative Example 1

A vacuum insulation material was prepared in the same manner as in Example except that the getter material was prepared by mixing a moisture absorbent composed of calcium oxide (CaO) and a hydrogen adsorbent composed of Zr/Ti in a ratio of 40:1.

After measuring initial thermal conductivity of the vacuum insulation material prepared in Comparative Example 1, the vacuum insulation material was subjected to heat treatment at 90° C. for 6 weeks, followed by measurement of thermal conductivity of the vacuum insulation material using a thermal conductivity tester.

Comparative Example 2

A vacuum insulation material was prepared in the same manner as in Example except that the getter material was prepared by mixing a moisture absorbent composed of calcium oxide (CaO) and a hydrogen adsorbent composed of Zr/Ba in a ratio of 40:1.

After measuring initial thermal conductivity of the vacuum insulation material prepared in Comparative Example 2, the vacuum insulation material was subjected to heat treatment at 90° C. for 6 weeks, followed by measurement of thermal conductivity of the vacuum insulation material using a thermal conductivity tester.

Comparative Example 3

A vacuum insulation material was prepared in the same manner as in Example except that the getter material was prepared using a moisture absorbent composed of calcium oxide (CaO) alone.

After measuring initial thermal conductivity of the vacuum insulation material prepared in Comparative Example 2, the vacuum insulation material was subjected to heat treatment at 90° C. for 6 weeks, followed by measurement of thermal conductivity of the vacuum insulation material using a thermal conductivity tester.

Figure 4:
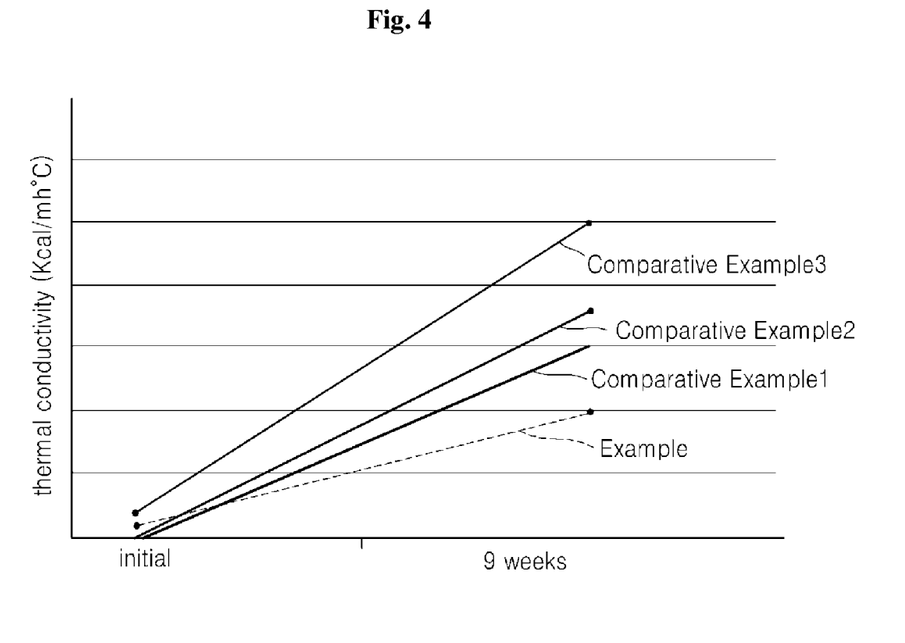
FIG. 4 is a graph depicting effects of a vacuum insulation material according to one embodiment of the present invention.

For the vacuum insulation materials prepared in Example and Comparative Examples, measurement results were clearly different as shown in FIG. 4. That is, the vacuum insulation material prepared in Example had a thermal conductivity of 0.0040 Kcal/mhr° C., the vacuum insulation material prepared in Comparative Example 1 had a thermal conductivity of 0.0045 Kcal/mhr° C., and the vacuum insulation material prepared in Comparative Example 2 had a thermal conductivity of 0.0048 Kcal/mhr° C. In addition, the vacuum insulation materials prepared in Comparative Example 3 had a thermal conductivity of 0.0055 Kcal/mhr° C.

From such results, it can be seen that the getter material 131 prepared by mixing an oxygen adsorbent composed of Fe-based compounds with a moisture absorbent is preferred, and can prevent deterioration in thermal conductivity due to release of a vacuum state over time.

Accordingly, the vacuum insulation material 100 preferably includes the getter unit 130 packing a getter material 131, in which a moisture absorbent composed of calcium oxide and a gas adsorbent composed of an Fe-based compound are mixed, with non-woven fabrics 132.

Although some embodiments have been described herein, it should be understood that these embodiments are given by way of illustration only, and that various modifications, variations, and alterations can be made without departing from the spirit and scope of the present invention. Therefore, the scope of the present invention should be limited only by the accompanying claims and equivalents thereof.

The invention claimed is:

1. A vacuum insulation material, comprising:
a core portion sealed in a pressure reduced state;
a getter unit disposed inside the core portion; and
an outer skin enclosing the core portion while sealing the core portion, wherein the getter unit comprises:
   a getter material comprising a moisture absorbent and a gas adsorbent; and
   a non-woven fabric enclosing the getter material, and
wherein the getter material comprises the moisture absorbent and the gas adsorbent in a ratio of 20:1 to 200:1.

2. The vacuum insulation material according to claim 1, wherein the moisture absorbent comprises a material selected from among calcium oxide, calcium chloride, zeolite, silica gel, alumina, and activated carbon, and the gas adsorbent comprises an oxygen adsorbent composed of an Fe-based compound.

3. The vacuum insulation material according to claim 2, wherein the oxygen adsorbent comprises one of $Fe_3O_4$, $Zn_2[Fe(CN)_6]$, $Zn_3[Fe(CN)_6]_2$, and $Ce[Fe(CN)_6]$.

4. The vacuum insulation material according to claim 1, wherein the non-woven fabric comprises a polypropylene non-woven fabric or a polyethylene non-woven fabric.

5. The vacuum insulation material according to claim 1, wherein the core portion comprises a material selected from among inorganic fibers, organic fibers, an expanded resin, inorganic powder, organic powder, and composite materials therewith.

6. The vacuum insulation material according to claim 5, wherein the inorganic fibers comprise glass wool, the organic fibers comprise polyester fibers, the expanded resin comprises one of polyurethane, polystyrene, polyethylene, and polypropylene resins, the inorganic powder comprises one of fumed silica, perlite, and carbon black, and the organic powder comprises synthetic resin powder.

* * * * *